Feb. 3, 1959 J. STARK, JR., ET AL 2,872,617
COLOR TELEVISION RECEIVER BRIGHTNESS CONTROL
Filed April 26, 1956
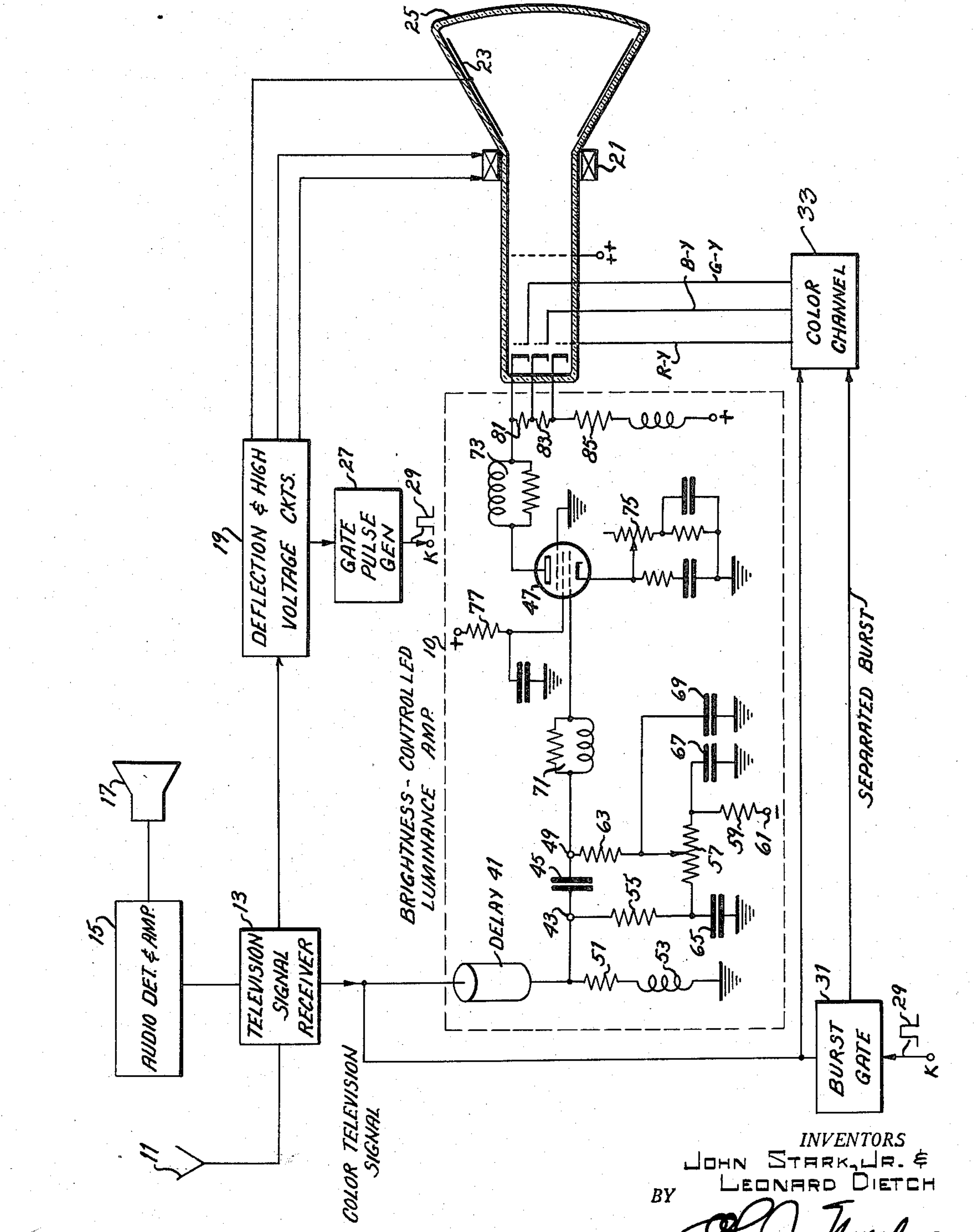
INVENTORS
JOHN STARK, JR. &
LEONARD DIETCH
BY
ATTORNEY United States Patent Office 2,872,617

Patented Feb. 3, 1959

2,872,617

COLOR TELEVISION RECEIVER BRIGHTNESS CONTROL

John Stark, Jr., Woodbury, and Leonard Dietch, Haddonfield, N. J., assignors to Radio Corporation of America, a corporation of Delaware Application April 26, 1956, Serial No. 580,933

8 Claims. (Cl. 315—30)

The present invention relates to improved circuits for providing brightness control in color television receivers.

The modern color television signal includes a luminance signal which describes the brightness information in a televised image. This signal has both an alternating current component (A. C.) and a direct current component (D. C.). The luminance signal alone, when applied to a color kinescope, produces a monochrome image thereon.

In color television receivers, the brightness of the reproduced luminance signal information may be adjusted by controlling the grid bias and therefore the operating point, plate current and plate voltage of the luminance signal amplifier device which applies the luminance signal to the color kinescope. However, in such a luminance signal amplifier wherein no clamp circuit or D. C. restorers are used, and wherein the luminance signal is D. C. coupled from the video detector to the color kinescope, it is very difficult to provide a bias control, and therefore a brightness control, which does not cause undue loss of the D. C. component information of the luminance signal, particularly at high brightness levels.

It is therefore an object of this invention to provide an improved brightness control circuit for use in a color television receiver.

According to the invention, a capacitance is used for translating the demodulated A. C. components of a luminance signal to the control grid of a luminance signal amplifier which is D. C. coupled to drive a color kinescope. A controllable network is utilized to both translate a prescribed amount of the D. C. component of that luminance signal to that same control grid of the luminance amplifier and to also control the grid bias of the luminance amplifier and therefore the brightness of the image reproduced by the kinescope. The network also maintains a high grid circuit impedance to the applied D. C. luminance component regardless of the brightness level to which the network is adjusted and provides nearly all the D. C. luminance signal component to the control grid for the network adjustment corresponding to the maximum brightness to minimize the possibility of that grid drawing current due to "white" picture information.

Other and incidental objects of this invention will become apparent upon a reading of the following specification and a study of the accompanying drawing which is a block and circuit diagram of a color television receiver including a brightness controlled luminance amplifier.

The drawing includes a schematic diagram of the brightness controlled luminance amplifier 10. Before describing the operation of this amplifier, consider first the operation of the color television receiver.

The incoming signal from the broadcast transmitter is received by the antenna 11 and demodulated in the television signal receiver 13. The demodulated color television signal includes luminance, color, audio, and deflection synchronizing signals. The audio information is processed in the audio detector and amplifier 15 and applied to the loud speaker 17. The picture deflection synchronizing signals are processed in the deflection and high voltage circuits 19 which apply vertical and horizontal deflection signals to the yokes 21 and a high voltage to the ultor 23 of the color kinescope 25. The deflection and high voltage circuit 19 also energize a gate pulse generator 27 which develops a gate pulse 29.

The color information in the color television signal includes synchronizing bursts during the retrace interval. These bursts have a prescribed duration on the "back porch" of each horizontal synchronizing pulse. The gate pulse 29 is therefore adapted to have a duration interval substantially that of the bursts during the retrace interval. The gate pulse 29 and the color television signal are applied to the burst gate 31 which separates the bursts.

The color channel 33, responsive to the separated bursts and to the color television signal supplied by the color television signal receiver 13, demodulates color information signals, referred to in the art as color difference signals, from the color television signal and applies a trio of color difference signals corresponding to red, green and blue to each of the control grids of the electron guns of the (cathode ray tube) color kinescope 25; these color difference signals are denoted as R–Y, B–Y and G–Y, where Y is the luminance signal.

The color television signal, constituting principally luminance signal information when not subjected to processing of the type employed in the color channel 33, is translated through the brightness-controlled luminance amplifier 10. The output signal of the brightness-controlled luminance amplifier 10 is applied to the cathodes of the electron guns of the color kinescope 25. When only the luminance signal is applied to the cathodes of the electron guns of the color kinescope 25, a monochrome image will be reproduced by that kinescope. Color difference signal information provided by the color channel 33 to additionally control the electron guns will cause the reproduction of the transmitted image in color.

The brightness controlled luminance amplifier 10 of the drawing performs the functions of brightness control according to the present invention and operates in the following manner. The luminance or brightness signal provided by the television signal receiver 13, is delayed in the delay line 41 and applied to terminal 43 which represents the input terminal of condenser 45. The A. C. components of the luminance signal pass through condenser 45 and are applied to the imputor control electrode of the video amplifier tube 47 by way of terminal 49. The D. C. component of the luminance signal is blocked by condenser 45. The network comprising the resistance 51 connected in series with the inductance 53 provides a high impedance to the delay line 41.

In addition to amplifying the A. C. components of the luminance signal and applying these components to the cathodes of the electron guns of the color kinescope 25, tube 47 also acts as a D. C. amplifier to the D. C. components of the luminance signal. Tube 47 additionally controls the current and the bias of the electron guns of the color kinescope 25 and therefore the brightness of the reproduced image. The control of the kinescope current is achieved by varying the grid bias and therefore the tube current or electron flow of tube 47. The D. C. components of the luminance signal are applied to the control grid of tube 47 by way of resistors 55, 57 and 63.

In addition, the greater portion of the D. C. component is caused to be developed at the first control grid for at least the condition of maximum brightness. This is particularly desirable at maximum brightness since tube 47 and the kinescope are operated close to zero bias for this condition. If the D. C. component in the television signal that reaches the first control grid of tube 47 is too low, black level is not adequately maintained and peak whites of a predominantly black picture will exceed the bias and draw grid current clipping this white detail. The circuit for applying the D. C. component and the grid-bias to the control grid of tube 47 includes the resistors 55 and 59 and potentiometer 57 connected in series between the input terminal 43 of condenser 45, and a terminal 61 at which is presented a negative voltage. A resistance 63 connects a sliding contact on potentiometer 57 to the terminal 49 from which terminal, the D. C. component is coupled to the first control grid of tube 47. Condensers 65, 67 and 69 are bypass condensers.

The D. C. component and the luminance signal will be developed across the serially connected resistors 55 and 59 and potentiometer 57. The amplitude level of the D. C. component developed across the sections of variable resistor (potentiometer 57) will be dependent upon the magnitude of this resistor relative to the magnitude of resistors 55 and 59. The D. C. component of the luminace will thereupon be translated along a path around condenser 45; this path includes resistor 55, the portion of potentiometer 57 between the sliding contact and the junction of this resistor with resistor 55, and resistor 63. The amount of D. C. component in the luminance signal applied to the first control grid of tube 47 will be thereupon dependent upon the position of the sliding contact on resistor 57.

A negative voltage is provided at terminal 61. This terminal is coupled to ground by way of resistors 51, 55, 57 and 59. Since the control grid of tube 47 is coupled to the sliding contact of resistor 57 by way of resistor 63, the bias voltage of tube 47 and therefore the current flow of tube 47 will be dependent upon the position of the sliding contact on the potentiometer 57.

The adjustment of the sliding contact of resistor 57 thereupon provides a pair of useful actions. Adjustment of this contact will change the grid bias of tube 47 and therefore the anode current provided by this tube. The anode of tube 47 is coupled to simultaneously drive the cathodes of the electron guns of the kinescope 25. Adjustment of the anode current of tube 47 will therefore control the bias voltage of each of these cathodes and therefore the beam current level of the electron beams provided by the electron guns of the color kinescope 25. The brightness of the reproduced picture will vary as the beam current level; the potentiometer 57 with the sliding contact therefore provides control of the brightness.

The sliding contact of resistor 57 also controls the percentage of D. C. picture content in the reproduced image. The higher percentage of D. C. component of the luminance signal applied to the amplifier 47 as the brightness control 57 is set for increased brightness prevents the control grid of tube 47 from drawing grid current on peak whites of the picture.

In the brightness controlled luminance aplifier 10 of the figure, the resistance inductance circuits 71 and 73 are peaking circuits. The circuit coupled from the cathode of tube 47 to ground includes the variable resistor 75 which provides contrast control by controllable degeneration of tube 47. The resistor 77 coupled from a voltage source to the screen grid of tube 47 provides a useful function of reducing the screen grid voltage when the current through tube 47 becomes large thereby protecting both tube 47 and also the color kinescope 25.

The negative voltage applied to terminal 61 may be derived from a bias source. In one form of color television receiver which utilizes the present invention, this bias voltage which is of negative polarity was obtained from the control grid of a horizontal output tube in the deflection and high voltage circuits 19. The serially connected resistors 81, 83, and 85 which are included in the anode load of tube 47, provide various magnitudes of the luminance signal which are respectively applied to the corresponding electron-gun cathode of the color kinescope 25.

Having described the invention, what is claimed is:

1. In a television receiver adapted to receive a brightness signal having both alternating current components and direct current components, a brightness control circuit, comprising in combination: an image reproducer; a brightness signal amplifier having an electron stream direct current coupled to drive said image reproducer and including a control electrode to control said electron stream; means to couple only the alternating components of said brightness signal to said control electrode; and means to apply both the direct current components of said brightness signal and a bias potential to said control electrode, said direct current component and bias applying means simultaneously controlling the amplitude of said direct current component and of said bias potential while said television receiver is in operation to provide control of the brightness of an image reproduced by said color image reproducer.

2. Apparatus for controlling the operation of a cathode ray tube having an input comprising, in combination, an amplifier having an input circuit and an output circuit coupled to said cathode ray tube input, a source of signals including both alternating current and direct current components, said input circuit comprising means defining an alternating current connection for coupling said signal source to said amplifier input circuit, and means defining a direct-current connection for variably coupling said signal source to said amplifier input circuit to thereby provide a means for varying the portions of the direct current components applied to said amplifier input circuit.

3. Apparatus for controlling the brightness of the image on a kinescope having an input comprising in combination a video amplifier having an input circuit and an output circuit direct coupled to said kinescope input, a source of video signals including both alternating current and direct current components, said input circuit comprising means defining an alternating current connection for coupling said signal source to said video amplifier input circuit, an adjustable means defining a direct-current connection for coupling said signal source to said video amplifier input circuit, and a source of bias potential, said adjustable means including a potentiometer connected between said signal source, and said bias source, said potentiometer having an adjustable contact connected to said video amplifier input circuit, whereby the image brightness on said kinescope is varied by adjustment of said adjustable contact.

4. Apparatus for controlling the brightness of the image on a kinescope having an input comprising, in combination a video amplifier having an input circuit and an output circuit direct coupled to said kinescope input, a source of video signals including both alternating current and direct current components, said input circuit comprising means defining an alternating current connection for coupling said signal source to said video amplifier input circuit, adjustable means defining a direct-current connection for coupling said signal source to said video amplifier input circuit, and a source of bias potential, said adjustable means including a serially connected variable resistor and second resistor connected between said signal source and said bias potential source, said variable resistor having a sliding contact connected to said video amplifier input circuit to vary the current flow in said video amplifier and thus the brightness of said image.

5. Apparatus for controlling the brightness of the image on a kinescope having an input comprising in combination a video amplifier having an output circuit direct coupled to said kinescope input and an input circuit, a source of video signals including both alternating current and direct current components, said input circuit comprising means for capacitively coupling said signal source to said video amplifier input circuit, adjustable means definng a direct-current connection for coupling said signal source to said video amplifier input circuit, a source of bias potential, said adjustable means including a potentiometer having a sliding contact connected between said signal source and said source of bias potential, and a third resistor coupled between said sliding contact and said video amplifier input circuit whereby the image brightness of said kinescope is varied with adjustment of said potentiometer.

6. In a television received adapted to receive a signal including a brightness signal having both alternating current components and direct current components, a brightness control circuit, comprising in combination; a kinescope; an amplifier having a control grid to control current therein; an output circuit direct current coupled to drive said kinescope; means to couple said alternating current components of said brightness signal to said control grid; a bias voltage source; a network responsive to said bias voltage; means independent of said alternating current coupling means to develop said direct current component of said brightness signal across said network, said network including a signal control means operatively connected to be capable of selecting various amplitude levels of said direct current component from said network and various magnitudes of bias voltage during operation of said color television receiver; high impedance means to couple said signal control means to said control grid to present a high impedance to the low frequency portions of said alternating current brightness component and to vary the amplifier current.

7. Apparatus for driving a kinescope having an input comprising, in combination, a video amplifier having an output circuit direct coupled to said kinescope input and an input circuit, a source of video signals for signals including both alternating current and direct current components, said input circuit comprising means for capacitively coupling said signal source to said video amplifier input circuit, adjustable means defining a direct-current connection for coupling said signal source to said video amplifier input circuit, a source of bias potential for said video amplifier, said adjustable means including a potentiometer having an adjustable contact, a second resistor and a third resistor serially connected to either end of said potentiometer, said serially connected potentiometer and second and third resistors connected between said bias source and said signal source whereby to vary the direct current flow in said video amplifier by simultaneously varying the amount of bias potential inversely with the amount of said direct current components that are applied to said video amplifier input circuit, and a fourth resistor coupled between said adjustable contact and said video amplifier input circuit.

8. Apparatus for controlling the brightness of the image produced on a color kinescope having an input comprising, in combination, a source of luminance signals which includes alternating current and direct current components, a luminance amplifier having an input circuit and an output circuit direct coupled to said color kinescope input, said input circuit including a capacitor for coupling said signal source to said luminance amplifier input circuit, adjustable means coupling said signal source to said luminance amplifier input circuit, a source of bias potential, said adjustable means including a potentiometer having a first terminal, a second terminal, and an adjustable contact, said first and second potentiometer terminals being connected between said signal source and said bias potential source, and a second resistor connected between said adjustable contact and said luminance amplifier input circuit whereby to control the amplitude of said direct current component and of said bias potential applied to said luminance amplifier input circuit to control the brightness of said image.

References Cited in the file of this patent

RCA, Color Television Receiver, Model CT-100, March 31, 1954, pages 31 to 34.